May 12, 1964
I. P. KAMINOW ETAL
3,133,198
TRAVELING WAVE LIGHT MODULATOR
Filed Jan. 12, 1962
2 Sheets-Sheet 1
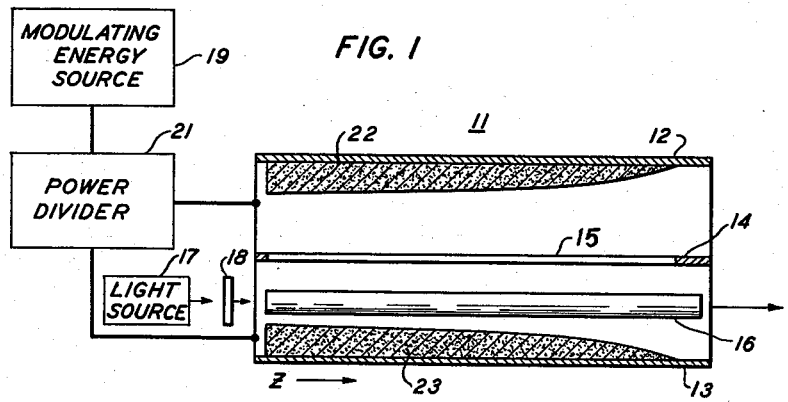
FIG. 1
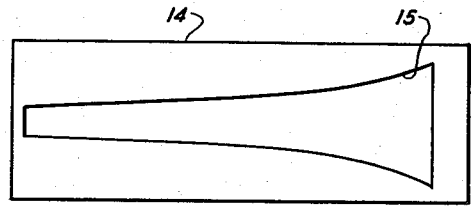
FIG. 1A
FIG. 2
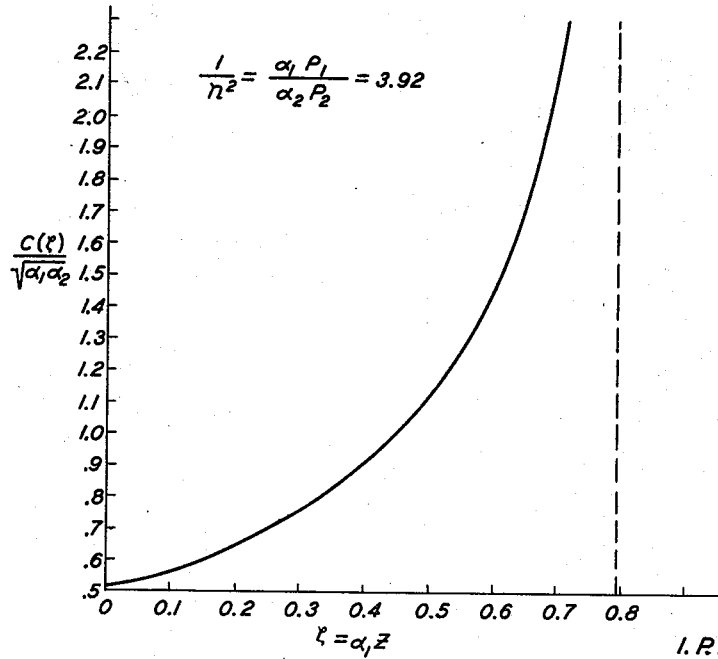
$$\frac{1}{n^2} = \frac{\alpha_1 P_1}{\alpha_2 P_2} = 3.92$$
INVENTORS: I. P. KAMINOW
R. KOMPFNER
W. H. LOUISELL
BY David P. Kelley
ATTORNEY

United States Patent Office 3,133,198
Patented May 12, 1964

3,133,198
TRAVELING WAVE LIGHT MODULATOR
Ivan P. Kaminow, New Shrewsbury, Rudolf Kompfner, Middletown, and William H. Louisell, Summit, N.J., assignors to Bell Telephone Laboratories, Incorporated, New York, N.Y., a corporation of New York
Filed Jan. 12, 1962, Ser. No. 165,964
5 Claims. (Cl. 250—199)

This invention relates to light modulators, and, more particularly, to traveling wave light modulators utilizing electro-optic effects.

It is well known that the amount of information which can be transmitted by coherent electromagnetic radiation varies directly as the available frequency bandwidth of the radiation employed and for a given percentage bandwidth the higher the frequency of the radiation, the greater the total bandwidth is. Heretofore the use of electromagnetic radiation at light frequencies, where, theoretically, the available bandwith is extremely large, has not been feasible because of the incoherent nature of the light produced by the existing light generators. The recent invention of the optical maser, which produces coherent electromagnetic waves at the frequencies of visible light has made feasible the use of light frequencies as information bearing radiation. It can readily be appreciated that coherent light is capable of carrying extremely large quantities of information, much more than the amount of information heretofore transmittable by electromagnetic radiation. In order to realize the maximum potential of the electromagnetic radiation at light frequencies, however, it is necessary that efficient apparatus for modulating the coherent light waves be provided. Modulation of light by means of electro-optical effects offers one possible solution to the problem of efficient modulation of a light beam. The electro-optic effect refers to changes in magnitude and symmetry of the ellipsoid of wave normals as a result of the application of electric fields of frequencies less than optical frequencies. In order to achieve wideband modulation by this effect it is necessary to use traveling wave interaction where the modulating radio frequency field travels with the same phase velocity as the light in some suitably proportioned structure for a substantial distance. Unfortunately, most electro-optically active substances have considerable loss at the modulating frequencies and when traveling wave interaction is employed the modulating wave is rapidly attenuated and a limit to the useful length of the interaction region is thereby set. As a consequence, the modulation is neither as efficient nor as broadband as desirable.

It is an object of this invention to modulate coherent light waves at very high frequencies.

It is another object of this invention to increase the efficiency of modulation in a traveling wave type electro-optical modulator.

It is still another object of this invention to modulate coherent light waves over a wide band of modulating frequencies.

These and other objects of the present invention are achieved in first and second illustrative embodiments thereof which comprise first and second waveguides which are coupled together over an extended region. The second waveguide has mounted therein an elongated member of electro-optical material which extends along the coupling region between the two guides. A light beam to be modulated is introduced into the electro-optical member at one end thereof and travels axially down the length of the second guide, and modulating power is fed into both of the guides and travels along the guides in the same direction as the light beam.

It is one feature of the invention that the coupling coefficient between the two guides is increased in an exponential-like manner in the direction of wave propagation so that more and more modulation power from the first guide is fed into the second guide.

It is another feature of the present invention that the propagation constants of both waveguides decrease along the length of the coupling region in a manner exactly the inverse of the increasing coupling coefficient.

With such an arrangement the modulating power introduced into the second waveguide and which under circumstances would be rapidly attenuated by the lossy electro-optical material, is constantly being replenished by modulating power from the first waveguide and in greater and greater amounts so that along the length of the coupling region the modulating power in the second waveguide remains substantially constant. In addition, the variation of propagation constants in the two guides maintains the modulating power in proper synchronism with the light beam throughout the length of the coupling region, thereby compensating for changes in the velocity of the modulating power produced by variations in the coupling coefficient.

In the first illustrative embodiment of the invention, the variation in propagation constants is achieved by dielectric loading in each of the waveguides, the loading being decreased along the length of the coupling region. In the second illustrative embodiment, this variation is achieved through changes in the dimensions of the waveguides themselves.

In another illustrative embodiment of the invention, a plurality of modulating cavities are arranged in sequence and the electro-optic material passes serially through them. A waveguide carrying the modulating power is coupled to each of the cavities in sequence. In accordance with the principles of the invention, the coupling between waveguide and cavities increases in the direction of wave propagation, while the propagation constant of the waveguide decreases along the direction of propagation.

These and other features and objects of the invention will be apparent from the following detailed description, taken in conjunction with the accompanying drawings, in which:

FIG. 1 is a partially schematic, partially sectional view of one illustrative embodiment of the invention;

FIG. 1A is a plan view of a portion of the device of FIG. 1;

FIG. 2 is a graph of coupling coefficient variation;

Figure 3:
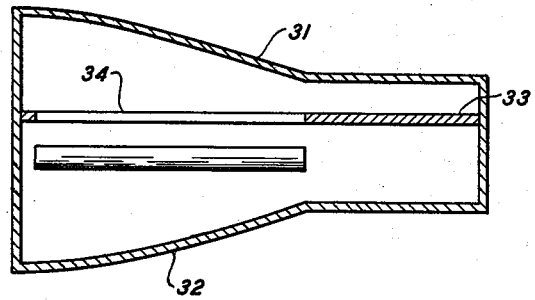
FIG. 3 is a sectional view of another illustrative embodiment of the invention.

Turning now to FIG. 1 there is depicted a modulating arrangement 11 embodying the principles of the present invention. Arrangement 11 comprises first and second waveguides 12 and 13 coupled together through a common wall 14 by a coupling slot 15. Waveguide 13 has mounted therein an elongated member 16 of electro-optical material which extends axially along the guide. A suitable material for member 16 is potassium dihydrogen phosphate (KDP), although any one of a number of other suitable materials might be used. For simplicity, the mounting means for member 16 has not been shown.

Light to be modulated is directed from a light source 17 through a polarizer 18 into member 16 for travel therethrough. Preferably polarizer 18 polarizes the light along one of the principal axes of member 16, although this is not strictly necessary. If the light is thus polarized, the modulation action will produce a phase modulation of the light. If the light is polarized at an angle to the principal axes, there will result a quasi-amplitude modulation of the light. An alternative way of achieving the desired light polarization is to taper the input end of member 16 at an angle equal to the well-known Brewster's angle.

Modulating energy, preferably in the microwave region is applied from a source 19 through a power divider 21, the purpose of which will be explained more fully hereinafter, into guides 12 and 13. The energy thus introduced into the two guides travels in the Z direction and modulates the light traveling in member 16. In view of the high loss characteristic at microwave frequencies of the member 16, it is necessary, for optimum modulating efficiency, to replenish the modulating power in guide 13 throughout the region of interaction. In FIG. 1A it can be seen that the slot 15 has a coupling coefficient that is varied with Z in a manner to be explained more fully hereinafter.

Consider two coupled transmission lines or guides 1 and 2 with loss constants $\alpha_1$ and $\alpha_2$ and propagation constants $\beta_1$ and $\beta_2$ respectively. Let the input modulation power be divided between the two guides such that $$P = P_1 + P_2 \tag{1}$$

where $P_1$ is the input power to guide 1 and $P_2$ is the input power to guide 2, where guide 2 is the guide containing the electro-optic material. Because of the large loss of the electro-optic material at the modulating frequencies $$\alpha_2 \gg \alpha_1 \tag{2}$$

For maximum efficiency, a constant modulating electric field $E_2$ must be maintained in guide 2 throughout the interaction region. It is therefore necessary that the power in guide 2 be independent of Z, the distance from the input, thus $$P_2(Z) \equiv P_2 \tag{3}$$

This requires that the coupling between guides 1 and 2 be varied. In order to achieve traveling wave interaction, it is also necessary that the light beam and the modulating wave remain in synchronism. As a consequence, if the coupling is made to vary with Z, the propagation constants $\beta_1$ and $\beta_2$ must be made to vary in some manner with Z. Thus $$\beta_1(Z) = \beta_2(Z) = \beta - C(Z) \tag{4}$$

where $\beta$ is the propagation constant of the light wave in the electro-optic material and $C(Z)$ is the coupling coefficient as a function of Z.

The coupled mode equations for two coupled waveguides with loss are $$\frac{da_1}{dZ} + j(\beta_1 + C)a_1 = jCa_2$$

$$\frac{da_2}{dZ} + j(\beta_2 + C)a_2 = jCa_1 \tag{5}$$

where $|a_{1,2}|^2$ represent the average power in each guide. $a_2(Z)$ may be expressed by $$a_2(Z) = \sqrt{P_2} e^{-j\beta Z} \tag{6}$$

By substituting Equations 4 and 6 into Equation 5 we arrive at $$C(Z) = \frac{C_0 e^{\alpha_1 Z}}{\sqrt{1 + h^2 - (h e^{\alpha_1 Z})^2}} \tag{7}$$

where $C_0$ is the coupling coefficient at the input and $$h^2 = \frac{C_0^2}{\alpha_1 \alpha_2} \tag{8}$$

Equation 7 shows how C must vary with Z in order to maintain the modulating electric field in guide 2 constant throughout the interaction region. This equation is plotted in FIG. 2 for $h^2 = .255$.

From FIG. 2, it can be seen that the coupling coefficient increases with Z in an exponential manner, and, hence, from Equation 4, the decrease in $\beta_1$ and $\beta_2$ with Z is exactly the inverse of the increase in $C(Z)$ inasmuch as $\beta$ is a constant.

A quantity that measures the modulation efficiency of the arrangement, i.e., rotation of the plane of polarization, or phase retardation or advancement of the light wave, is proportional to the product of the constant electric field strength times the length over which the interaction takes place, thus $$E_2 1 = k\sqrt{P_2} l \tag{9}$$

From Equation 9 and the foregoing equations, it can be shown that for maximum efficiency, $$\frac{\alpha_1 P_1}{\alpha_2 P_2} \simeq 3.92 \tag{10}$$

which shows how the input power must be divided between the two guides.

From the foregoing development the criteria for maximum efficiency of modulation and maximum bandwidth have been established. Returning now to FIGS. 1 and 1A, it can be seen that slot 15 has a coupling coefficient which varies in an exponential manner like the curve of FIG. 2. In order that the proper synchronism between light beam and modulating wave be maintained guides 12 and 13 are provided with dielectric loading members 22 and 23. Members 22 and 23 function to vary the propagation constants of the two guides to compensate for the variations in the coupling coefficient and thereby maintain synchronism. It can be seen that the propagation constants of the two guides are varied inversely, as the coupling coefficient, as discussed heretofore.

While a single coupling slot and dielectric loading have been shown, obviously other types of coupling schemes, such as a plurality of slots, might be used. The propagation constants of the guides may be varied in any of a number of ways known in the art. In FIG. 3, for example, there are shown two guides 31 and 32 coupled together through a common wall 33 by a coupling slot 34. The actual dimensions of the guides are varied in an exponential manner to produce varying propagation constants. For simplicity, the remaining elements of the modulating system have not been shown in FIG. 3.

In both the embodiments of FIGS. 1 and 3, there will be power remaining in the guides at the end of the interaction region. The guides may be terminated in any suitable manner, or the power in the guides may be abstracted for use elsewhere. For most efficient modulation, power divider 21 is adjusted to produce the power ratio set forth in Equation 10. While this ratio is preferable, it is not absolutely essential, and other ratios might be used.

Figure 4:
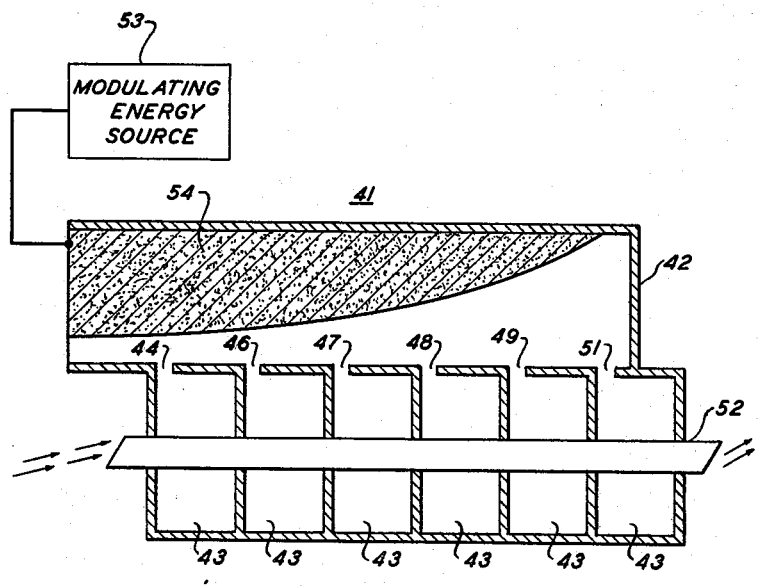
FIG. 4 is a sectional view of still another illustrative embodiment of the invention.

In both the embodiments of FIGS. 1 and 3, traveling wave interaction was utilized in which velocities of propagation were matched in both waveguides. In FIG. 4 there is depicted an arrangement 41 which comprises an elongated waveguide 42 which is coupled in sequence through coupling slots 44, 46, 47, 48, 49 and 51 to an array of modulating cavities 43. An elongated member 52 of electro-optic material passes serially through the array of cavities. Light to be modulated is introduced from a source, not shown, into one end of member 52, which in order to achieve the desired polarization, has been cut at Brewster's angle. Modulating energy from a source 53 is introduced into guide 42. In order that the energy in guide 42 may travel in proper phase with the light in member 52, guide 42 is loaded with loading member which, as was the case in the embodiments of FIGS. 1 and 3, is formed to produce a propagation constant in guide 42 that decreases in an exponential manner.

In accordance with the present invention, each successive coupling slot of the array of slots 44 through 51 is larger than the preceding slot so that each successive cavity of the array has more modulating energy coupled with it. The variation in slot size, and hence the amount of energy coupled, is the exponential variation depicted in FIG. 2, and the variation in propagation constant in guide 42 is the inverse. In each cavity of the array, the standing waves of modulating energy set up therein act to modulate the light beam through the electro-optical process, after which the light is extracted for utilization. Guide 42 may be terminated in any suitable manner, or the energy remaining therein at the end of the coupling region may be extracted for utilization. With the arrangement of FIG. 4, it can readily be shown that with $n$ modulators, the modulation efficiency is increased by a factor of $\sqrt{n}$.

In the arrangement of FIG. 4, as an alternative to guide 42 and varying coupling slots, the modulating power can be fed into the modulating cavities 43 through a branching network of waveguides suitably proportioned and loaded to maintain the proper power and phase relationships in each of the modulators.

While, the principles of the invention have been illustrated in several embodiments utilizing the rectangular waveguides, it will be readily apparent to workers in the art that, other configurations are possible. Additionally the principles of the invention are capable of utilization in other types of apparatus such as, for example, linear particle accelerators, without departure from the spirit and scope thereof.

What is claimed is:

1. A light modulator comprising a waveguide and an interaction structure, said waveguide and said structure being electromagnetically coupled together over an extended region, an elongated member of electro-optic material in said structure, means for directing light to be modulated into said member for travel axially therealong through said interaction structure, means for applying modulating energy to said waveguide for travel therethrough along the region of coupling, the region of coupling having a coupling coefficient which increases in an exponential manner in the direction of travel of said energy and said beam and said waveguide having a propagation constant that decreases in an exponential manner that is the inverse of the increasing coupling coefficient.

2. A light modulator as claimed in claim 1 wherein said interaction structure comprises a second waveguide having a propagation constant that decreases in the exponential manner of the first mentioned waveguide.

3. A light modulator as claimed in claim 1 wherein said interaction structure comprises an array of modulating cavities through which said electro-optic material passes.

4. A light modulator as claimed in claim 1 wherein the coupling coefficient between the waveguide and the structure varies as $$C(Z) = \frac{C_0 e^{\alpha_1 Z}}{\sqrt{1+h^2-(he^{\alpha_1 Z})^2}}$$

where $C_0$ is the coupling coefficient at the input, $\alpha_1$ is the loss constant of said guide, $Z$ is distance from the input, and $h$ is given by $$h^2 = \frac{C_0^2}{\alpha_1 \alpha_2}$$

where $\alpha_2$ is the loss constant in said structure.

5. A light modulator as claimed in claim 4 and further comprising means for dividing the modulating energy at the input between the guide and said structure in accordance with the ratio $$\frac{P_1}{P_2} \simeq 3.92 \frac{\alpha_2}{\alpha_1}$$

where $P_1$ is the input power to the guide and $P_2$ is the input power to the structure.

No references cited.